Nov. 9, 1948.　　　　T. B. CHACE　　　　2,453,409
FLUID CONTROL SYSTEM
Filed July 14, 1944　　　　　　　　　　　　2 Sheets-Sheet 2

Inventor
THOMAS B. CHACE.
by Charles W. Hills Attys.

Patented Nov. 9, 1948

2,453,409

UNITED STATES PATENT OFFICE 2,453,409

FLUID CONTROL SYSTEM

Thomas B. Chace, Winnetka, Ill., assignor to The Dole Valve Company, Chicago, Ill., a corporation of Illinois Application July 14, 1944, Serial No. 544,956

4 Claims. (Cl. 236—12)

This invention relates to a fluid control system and more particularly to a fluid control system having a single automatic temperature controlled mixer valve with arrangement for combining and delivering the fluids in different selected quantities at different selected temperatures.

In many fluid supply systems it is desirable to deliver fluid at different predetermined temperatures and in different predetermined amounts at different successive stages in a cycle of operation. This is particularly true of the water supply system of an automatic washing machine. Due to the fact that the amount of hot water usually available in a home is limited, it is extremely important that the use of hot water be as economical as is consistent with the results desired.

It is one of the principal features and objects of the present invention to provide a novel fluid control system in which a wide variety of fluid delivery temperatures may be obtained through the use of only a single temperature controlled mixer valve, and without changing the temperature setting of the mixer valve.

A further object of the present invention is to provide a novel fluid control system including an automatic temperature controlled mixer valve and a plurality of controlled paths for bypassing the mixer valve.

Another object of the present invention is to provide novel means for selecting and combining fluid of different predetermined temperatures in different selected proportions.

A still further object of the present invention is to provide a novel fluid control system including an automatic temperature controlled mixer valve, a plurality of constant rate of flow maintaining devices and a plurality of shut-off valves.

Figure 1:
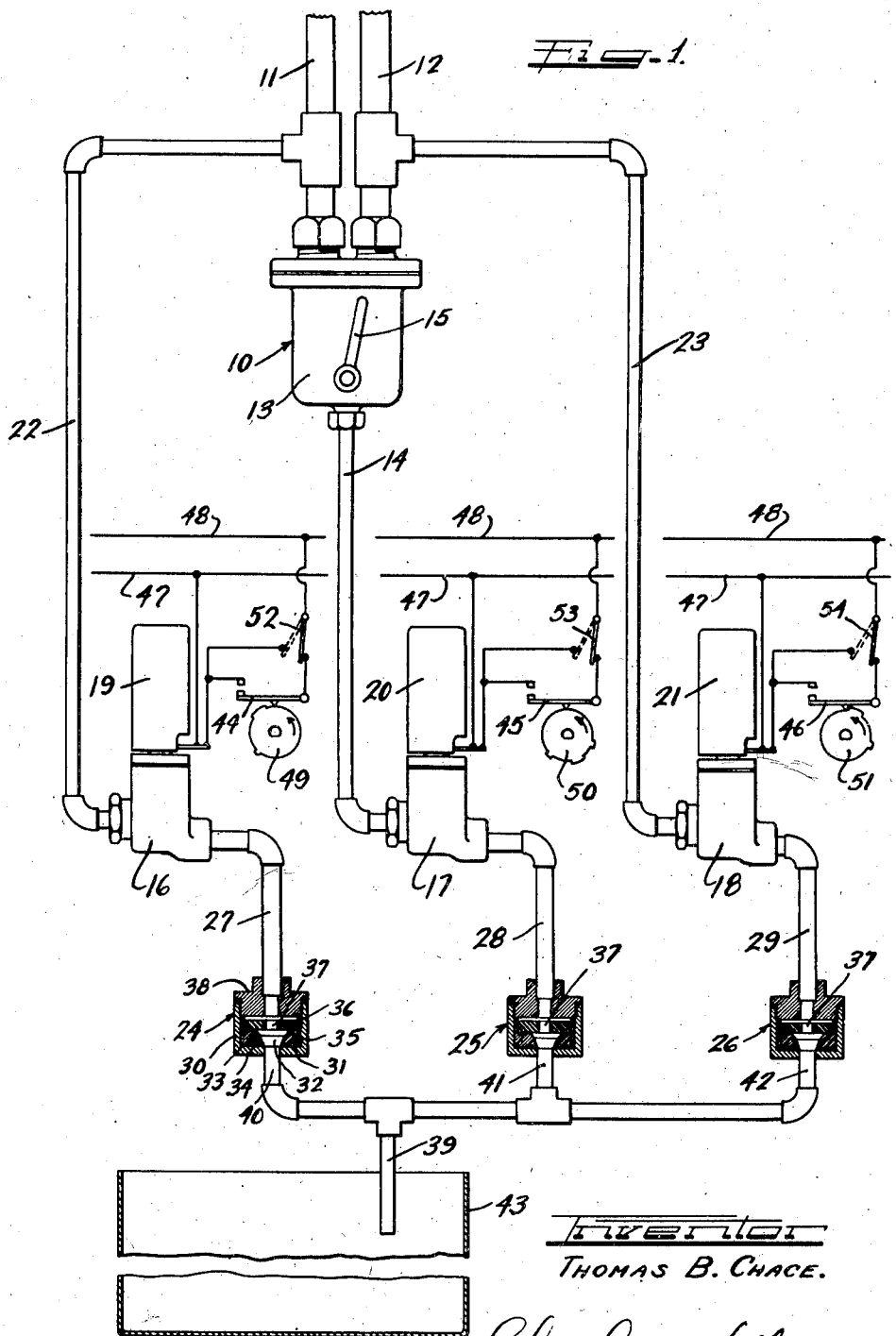
Figure 2:
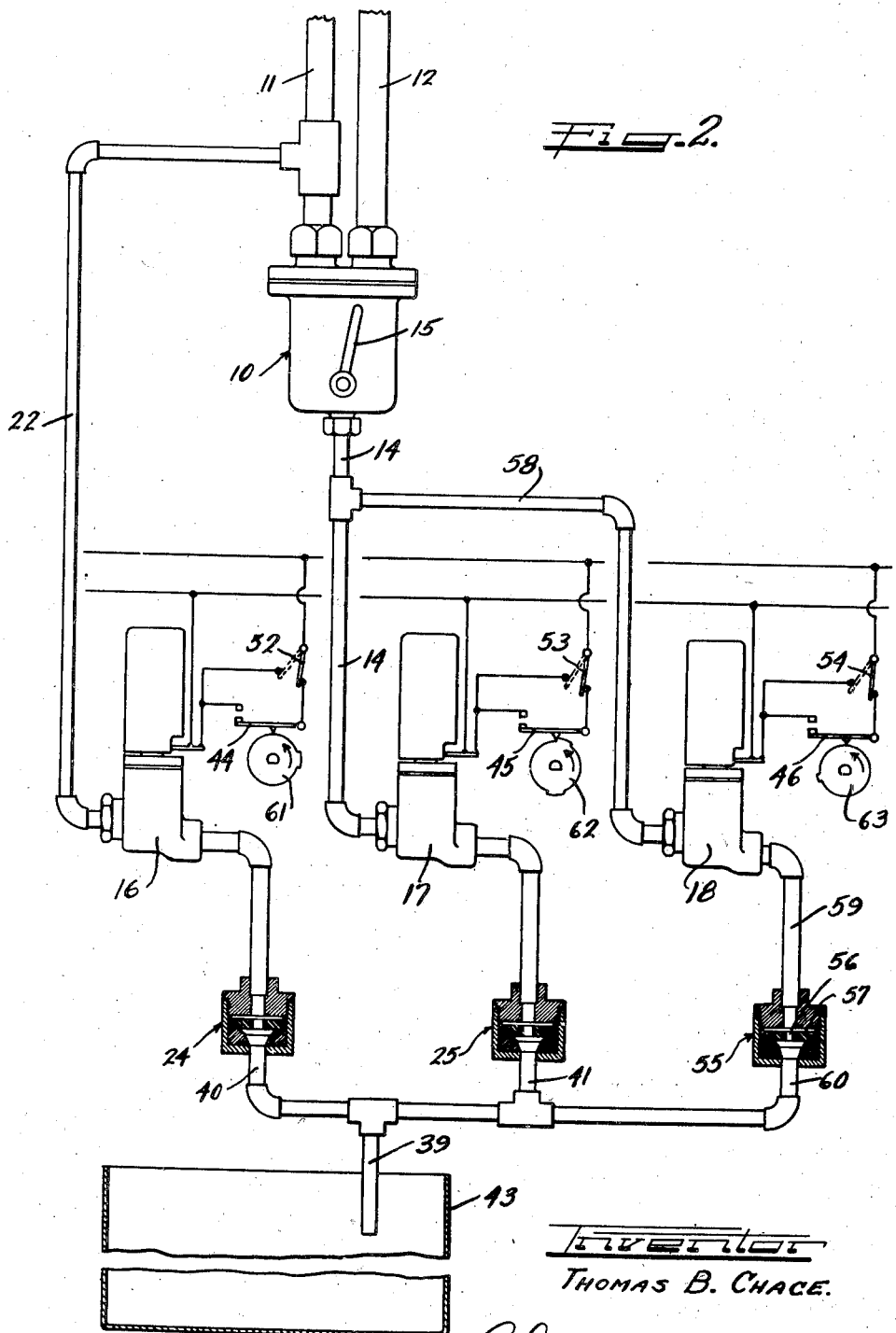

The novel features which I believe to be characteristic of my invention are set forth with particularity in the appended claims. My invention itself, however, both as to its organization, method of operation and manner of construction, together with further objects and advantages thereof, may best be understood by reference to the accompanying drawings, in which:

Figure 1 is a diagrammatic illustration of a fluid control system embodying the novel teachings of the present invention; and Figure 2 is a diagrammatic illustration of a second embodiment of the present invention.

The fluid control system diagrammatically illustrated in Figure 1 of the drawings includes an automatically controlled mixer valve 10. This mixer valve 10 is connected to a hot fluid inlet duct 11 and a cold fluid inlet duct 12. This mixer valve may be of any conventional design having a temperature responsive means therein for automatically proportioning fluid of normally different temperatures to maintain the resulting mixed fluid at a predetermined temperature level. The fluid, such, for example, as water, is mixed within the housing 13 and is delivered through the mixed fluid delivery pipe 14. This automatic temperature controlled mixer valve 10 is preferably provided with a temperature adjusting member 15 for changing the temperature setting of the temperature responsive means to maintain the mixed fluid at any desired temperature within the temperature range of the mixing valve.

In the fluid control system of the embodiment of the invention shown in Figure 1 of the drawings, three electrically operated shut-off valves 16, 17 and 18 are provided. These electrically operated shut-off valves may be of any conventional design and are under the control of solenoids 19, 20 and 21 respectively. While only diagrammatically shown it will be understood that these solenoids 19, 20 and 21 are associated with their shut-off valves in such a manner that when energized the valve is opened and when de-energized the valve is closed.

The mixed fluid outlet pipe 14 is connected to the upstream side of the shut-off valve 17. A conduit 22 extending from the hot fluid supply pipe 11 to the upstream side of the shut-off valve 16 bypasses the mixer valve 10. A conduit 23 extending from the cold fluid supply pipe 12 to the upstream side of the shut-off valve 18 also bypasses the mixer valve 10. The downstream sides of the shut-off valves 16, 17 and 18 are connected to three automatic constant rate of flow maintaining devices 24, 25 and 26 respectively through pipes 27, 28 and 29. These flow control devices 24, 25 and 26 are preferably of a design similar to that described in the copending application of Leslie A. Kempton, entitled "Flow control," Serial No. 545,312, filed July 17, 1944, and assigned to the same assignee as the present invention. Each of these constant rate of flow maintaining devices 24, 25 and 26 is arranged to deliver a substantially constant volume of liquid therethrough in a given interval of time irrespective of wide variations or fluctuations in pressure on the inlet and outlet sides thereof.

For the purpose of understanding the present invention it is sufficient to say that the constant rate of flow maintaining device 24 includes a housing 30 in which a seat member 31 is disposed having a central opening 32 defined by two frusto-conical surfaces 33 and 34. The frusto-conical surface 33 merges into a shoulder 35 upon which a disk 36 of resilient material having a central orifice 37 is disposed. The central orifice 37 is substantially smaller than the upper edge of the frusto-conical surface 33 and for that reason it will be understood that as the pressure drop across the resilient disk 36 increases the disk 36 is flexed to vary the effective size of the orifice 37. It has been found that with a construction of this type a constant delivery rate will be maintained over wide variations in pressure, such, for example, as over a variation in pressure of from 20 pounds per square inch to 150 pounds per square inch. A cap 38 is provided for the housing 30 which retains the seat member 31 in place.

The construction of the flow control devices 25 and 26 is similar to that described in connection with the flow control device 24. The rate at which one of these flow control devices will permit fluid to pass therethrough will depend upon the size of the orifice 37 and its relation to the physical dimensions of the seat member 31. In the embodiment of the invention shown in Figure 1 all of the orifices 37 of the flow control devices 24, 25 and 26 are of the same size and accordingly are designed to permit fluid to flow therethrough at the same rate. By way of illustration and not by way of limitation, these flow control devices 24, 25 and 26 might be dimensioned to permit fluid to flow therethrough at the rate of five gallons per minute.

The downstream sides of the flow control devices 24, 25 and 26 are connected to a common delivery duct 39 through pipes 40, 41 and 42. This delivery pipe 39 is diagrammatically illustrated as being disposed over a container or tub 43 which may, for example, be the fluid containing tub of an automatic washing machine. While only a single fluid delivery duct 39 is shown, it will, of course, be understood that this fluid delivery duct 39 may be divided up into a plurality of outlets under individual valve control, if desired.

In the embodiment of the invention illustrated in Figure 1 the shut-off valves 16, 17 and 18 are arranged to be automatically controlled through cam operated switches 44, 45 and 46 respectively, which, when closed, energize their associated solenoids 19, 20 and 21, a suitable source of power, represented by the power supply conductors 47 and 48, being provided as a source of energy. Timer driven cams 49, 50 and 51 are provided for actuating the switches 44, 45 and 46. For the purpose of understanding the present invention, it is sufficient to state that the cams 49, 50 and 51 are driven at the same speed, they being preferably mounted on a common cam shaft (not shown) driven by a timer motor (not shown).

The time at which the switch is closed and the duration of its closure is determined by raised peripheral portions on the cam. Let it be assumed that the tub 43 is to be successively filled with water at a number of successive stages in a cycle of operation and that for each successive fill a higher temperature is desired. Under such an arrangement the cams 49, 50 and 51 might be provided with the raised peripheral portions as shown in Figure 1. Under such circumstances the switch 46 is arranged to be closed first and remains closed for a predetermined period of time. If the tub 43 is to be supplied with fifteen gallons of water for each fill and the flow control devices 24, 25 and 26 are each arranged to pass fluid therethrough at the rate of five gallons per minute, the switch 46 would be closed for a period of three minutes.

Upon closure of the switch 46 the solenoid 21 is energized and the shut-off valve 18 is opened. Water from the cold water supply duct 12 passes through the pipe 23, the shut-off valve 18 and the flow control device 26 to the delivery pipe 39. This flow continues until the switch 46 is open. At a later time the switches 45 and 46 are closed simultaneously to energize solenoids 20 and 21 for opening shut-off valves 17 and 18. For the purposes of this illustrative example, let it be assumed that the temperature of the water in the cold water supply duct 12 is 50°, that the temperature of the water in the hot water supply duct 11 is 200°, and that the automatic temperature controlled mixer valve 10 is arranged to deliver water at 150° in the mixed fluid outlet duct 14. Under such circumstances, the temperature of the water delivered to the tub 43 when the shut-off valves 17 and 18 are simultaneously opened would be approximately 100° (since the flow control devices 25 and 26 have the same fluid delivery rate. Since the water which is permitted to pass through each of the flow control devices 25 and 26 is five gallons per minute, it will be apparent that the solenoids 20 and 21 need only be energized half as long as when only one is energized at a time. This is shown by the raised peripheral portions on the cams 50 and 51. In other words, the switches in the second stage of the cycle of operation remain closed only for a minute and a half.

The third stage in the cycle of operation causes only the switch 45 to be closed and hence water is delivered at 150° to the tub 43. The fourth stage in the cycle of operation causes switches 44 and 45 to be closed simultaneously for a period of a minute and a half, which mixes water from hot fluid supply duct 11 with water from the mixed fluid outlet duct 14. The temperature of the water delivered to the tub 43 will therefore be approximately 175°. In the fifth stage in the cycle of operation the switch 44 is closed for a period of three minutes, which supplies hot water directly from the hot water supply duct 11 to the tub 43 at 200°.

In order to illustrate the flexibility of this control system each of the solenoids 19, 20 and 21 have a manual switch 52, 53 and 54 respectively, which, when thrown from the full line position as shown in Figure 1, to the dotted line position, will effect energization of its associated solenoid, irrespective of the position of the associated cams.

It will also be understood that all three shut-off valves 16, 17 and 18 may be opened simultaneously if desired. This will deliver a large quantity of water in a very short period of time. When the flow control devices 24, 25 and 26 are all of the same delivery rate and the water temperatures are as given in the above example, the combined mixture would provide a supply of water for the tub 43 at approximately 133°.

Figure 2 of the drawings illustrates a second embodiment of the present invention and differs from the first embodiment primarily in the manner in which the bypass arrangments are made. More particularly, in the fluid control system of Figure 2 includes an automatic temperature controlled mixer valve 10, three shut-off valves 16, 17 and 18, and three flow control devices 24, 25 and 55. Where the elements are the same as the corresponding elements in Figure 1, they have been given the same reference numerals. The flow control device 26 of Figure 1 has been replaced by a flow control device 55 having a much lower flow rate, as is represented by the small orifice 56 in the disk of resilient material 57. By way of example and not by way of limitation, the flow rate of the devices 24 and 25 may be five gallons per minute, while the flow rate of the flow control device 55 may be one gallon per minute.

The hot fluid supply duct 11 is connected through a bypass pipe 22, the shut-off valve 16, the flow control device 24 and a pipe 40 to the tub delivery pipe 39. The mixed fluid outlet pipe 14 of the automatic temperature controlled mixer valve 10 connects through the shut-off valve 17, the flow control device 25 and the pipe 41 to the tub delivery pipe 39. The mixed fluid outlet pipe 14 also connects through a pipe 58 to the upstream side of the shut-off valve 18 and thence through a pipe 59, the flow control device 55, and a pipe 60 to the tub delivery pipe 39.

To illustrate an application of the fluid control system of Figure 2, let it be assumed that the supply pipes 11 and 12 are water supply pipes, and that the temperature of the water in the hot water supply pipe is approximately 175° and that the temperature of the water in the cold water supply pipe is approximately 75°. Let it also be assumed that the automatic temperature controlled mixer valve 10 is adjusted to deliver water in the mixed fluid outlet pipe 14 at a temperature of 150°. The switches 44, 45 and 46 are provided with cams 61, 62 and 63 having raised peripheral portions, as clearly shown in Figure 2 of the drawings. As the cams start to rotate the switch 45 will first be closed for a period of three minutes, which causes the water to be delivered to the tub 43 at a temperature of 150°. This might be considered as the soak period of an automatic washing machine.

At a second stage in a cycle of operation and after the tub 43 has been emptied of the water used during the first stage, the switch 44 is closed by the cam 61 for a period of three minutes. This causes the tub 43 to be filled with water at 175°. This might be considered to be the wash period of the automatic washing machine.

At a third stage in the cycle of operation and after the tub 43 has been drained of the water employed during the preceding stage, the switch 45 is again closed by the cam 62 for a period of three minutes to deliver 150° water to the tub 43. This might be considered to be the wash-rinse operation of the cycle.

At a fourth stage in the cycle of operation and after the tub 43 has been drained of the water employed during the preceding stage, the switch 46 is closed by the cam 63, for a period of a minute and a half. This causes only a gallon and one-half of water at 150° to be supplied to the tub 43. This might be considered to be the spray-rinse stage in the cycle of operation.

As has previously been pointed out, the tub delivery pipe 39 has been illustrated as a simple pipe, but it is to be understood that this is merely a diagrammatic illustration of the final delivery supply pipe to the delivery pipe. This pipe may, if desired, have more than one branch under the control of any suitable shut-off valve, such, for example, as when a spray-rinse is desired. The spray-rinse delivery pipe (not shown) will branch off from the main delivery pipe 39 so that the fluid is delivered at any point desired within or over the tub 43.

While I have shown particular embodiments of my invention, it will, of course, be understood that I do not wish to be limited thereto, since many modifications may be made and I, therefore, contemplate by the appended claims to cover all such modifications as fall within the true spirit and scope of my invention.

I claim as my invention:

1. A fluid control system comprising a single automatic temperature controlled mixer valve, said mixer valve having a pair of inlet ducts and a mixed fluid outlet duct, at least three flow control means, each including a shut-off valve and a device for automatically maintaining a predetermined rate of fluid flow therethrough, and a member providing a common delivery passageway to which the downstream side of each flow control means is connected, the upstream side of two of said flow control means being connected to said outlet duct and the upstream side of one of said flow control means being connected to one of said inlet ducts.

2. A fluid control system comprising a single automatic temperature controlled mixer valve, said mixer valve having a pair of inlet ducts and a mixed fluid outlet duct, at least three flow control means, each including a shut-off valve and a device for automatically maintaining a predetermined rate of fluid flow therethrough, and a member providing a common delivery passageway to which the downstream side of each flow control means is connected, the upstream side of two of said flow control means being connected to said outlet duct and the upstream side of one of said flow control means being connected to one of said inlet ducts, one of the flow control means connected to said outlet duct having a flow regulating device of a different rate of flow than said other devices.

3. A fluid control system comprising relatively hot and cold fluid inlet ducts, an automatic temperature controlled mixer valve connected to said inlet ducts and having a mixed fluid outlet duct, a flow control unit including a shut-off valve and means for maintaining a constant predetermined rate of flow, a delivery pipe, said flow control unit connecting said outlet duct to said delivery pipe, and means including a pair of passageways bypassing said flow control unit and connecting one of said inlet ducts to said delivery pipe and said outlet duct to said delivery pipe respectively, each of said passageways including a shut-off valve and means for maintaining a constant predetermined rate of flow.

4. A fluid control system comprising a single automatic temperature control mixer valve, said mixer valve having a pair of inlet ducts for hot and cold fluid and a mixed fluid outlet duct, and at least three flow control devices each including a shut-off valve and a device for automatically maintaining a predetermined rate of fluid flow therethrough, and a member providing a common delivery passageway to which the downstream side of each flow control device is connected, the upstream side of two of said flow control devices being connected to said outlet duct and the upstream side of one of said flow control devices being connected to one of said inlet ducts, one of the flow control devices connected to said outlet duct having a flow regulating device of a different rate of flow than said other devices, and a timer controlled means for selectively opening different shut-off valves for a predetermined period to sequentially deliver predetermined quantities of fluid at different temperatures.

THOMAS B. CHACE.

REFERENCES CITED

The following references are of record in the file of this patent:

UNITED STATES PATENTS

| Number | Name | Date |
|---|---|---|
| 2,188,366 | Lindstaedt | Jan. 30, 1940 |
| 2,296,266 | Breckenridge | Sept. 22, 1942 |
| 2,321,573 | Chace | June 15, 1943 |